United States Patent [19]

Blood

[11] Patent Number: 4,945,305
[45] Date of Patent: * Jul. 31, 1990

[54] DEVICE FOR QUANTITATIVELY MEASURING THE RELATIVE POSITION AND ORIENTATION OF TWO BODIES IN THE PRESENCE OF METALS UTILIZING DIRECT CURRENT MAGNETIC FIELDS

[75] Inventor: Ernest B. Blood, Burlington, Vt.

[73] Assignee: Ascension Technology Corporation, Vt.

[*] Notice: The portion of the term of this patent subsequent to Jul. 18, 2006 has been disclaimed.

[21] Appl. No.: 336,342

[22] Filed: Apr. 11, 1989

Related U.S. Application Data

[63] Continuation-in-part of Ser. No. 917,389, Oct. 9, 1986, Pat. No. 4,849,692.

[51] Int. Cl.⁵ .......................... G01B 7/14; G01S 5/04
[52] U.S. Cl. .......................... 324/207.17; 324/207.11; 324/207.15; 324/207.26; 342/451
[58] Field of Search ............... 324/207, 208, 235, 247; 342/450, 451, 452, 453; 348/870.31

[56] References Cited

U.S. PATENT DOCUMENTS

| | | |
|---|---|---|
| 3,121,228 | 2/1964 | Kalmus . |
| 3,133,283 | 5/1964 | Ghose . |
| 4,560,930 | 12/1985 | Kouno . |
| 4,613,866 | 9/1986 | Blood . |
| 4,849,692 | 7/1989 | Blood .................................. 324/208 |

Primary Examiner—Reinhard J. Eisenzopf
Assistant Examiner—Walter E. Snow
Attorney, Agent, or Firm—Davis, Bujold & Streck

[57] ABSTRACT

A device for measuring the position (location and orientation), in the six degrees of freedom of receiving antennae (3) with respect to transmitting antennae (2) utilizing pulsed DC magnetic signals. The transmitting and receiving components consist of two or more transmitting antennae of known location and orientation with respect to each other. The transmitting antenna (2) are driven one at a time (or in the case of three or more antennae one or two at a time) by a pulsed, direct current signal. The receiving antennae (3) measure the transmitted direct current magnetic fields and the earth's magnetic field. A computer (5) is used to control the transmitting and receiving elements and to convert the received signals into location and orientation outputs.

25 Claims, 11 Drawing Sheets

COMPUTATION AND CONTROL TASKS

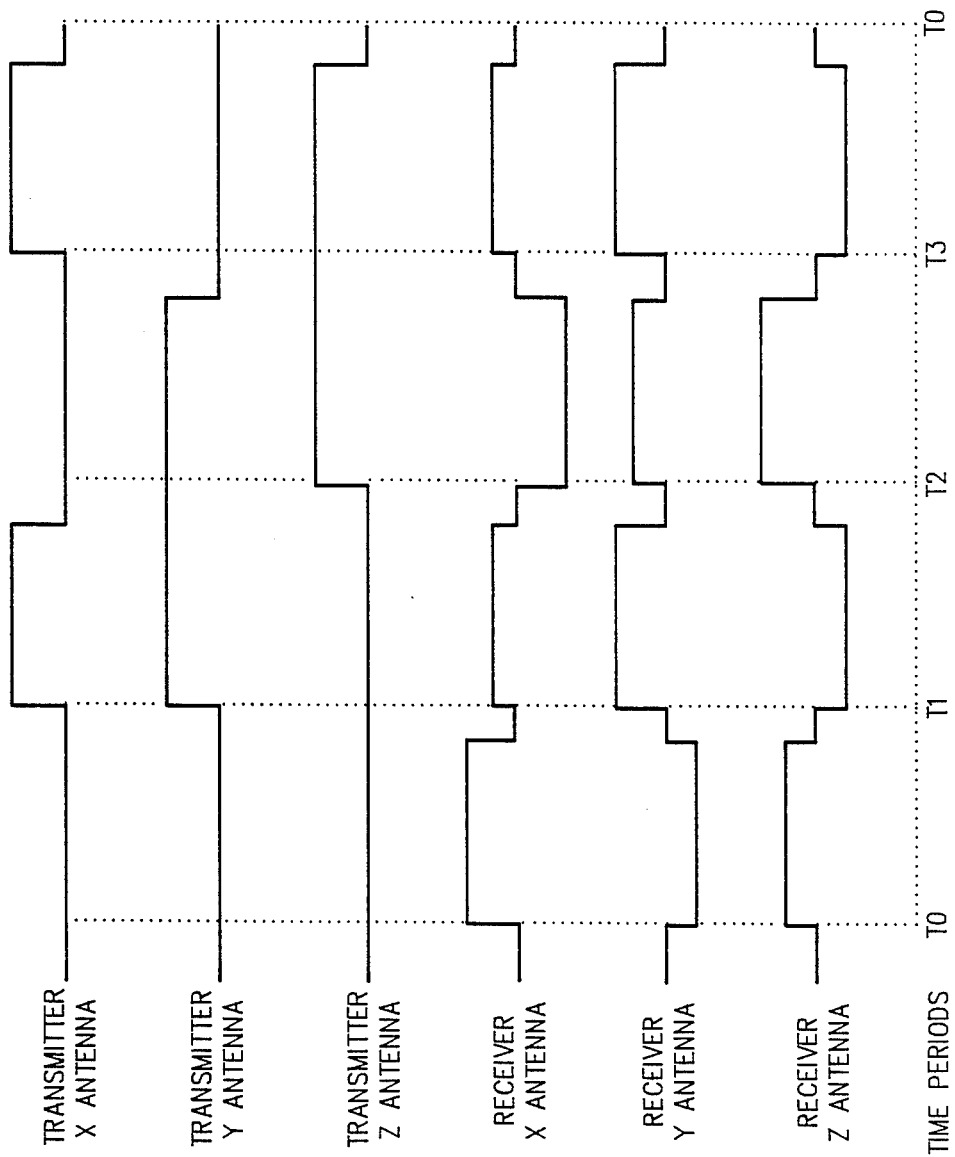

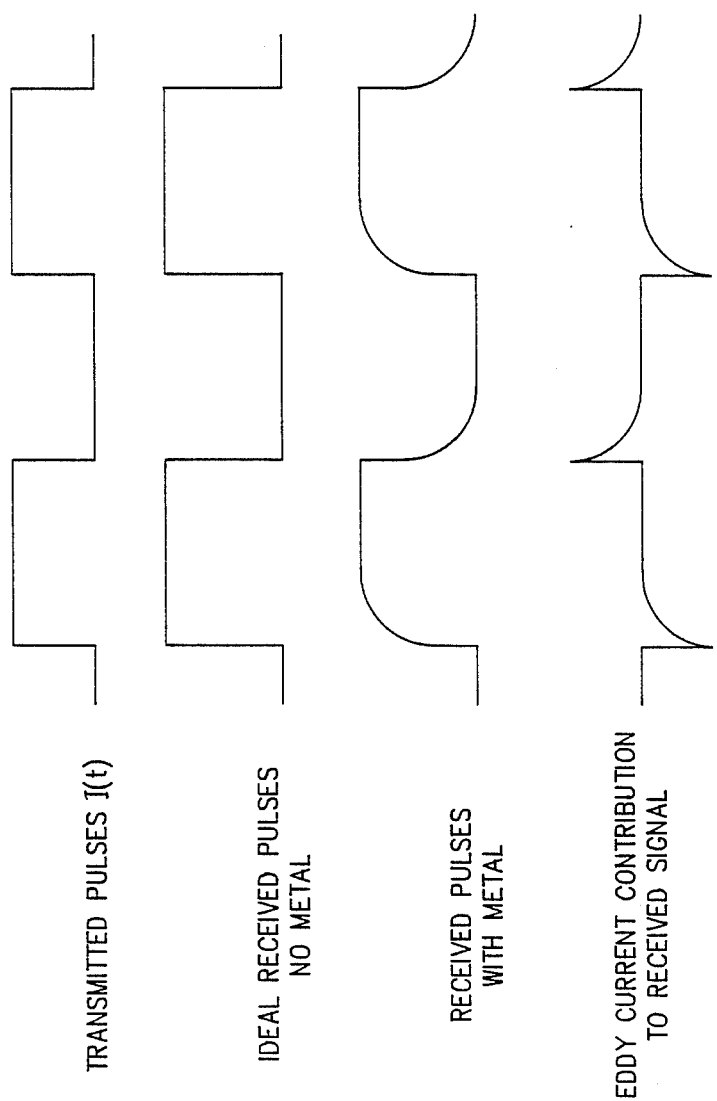

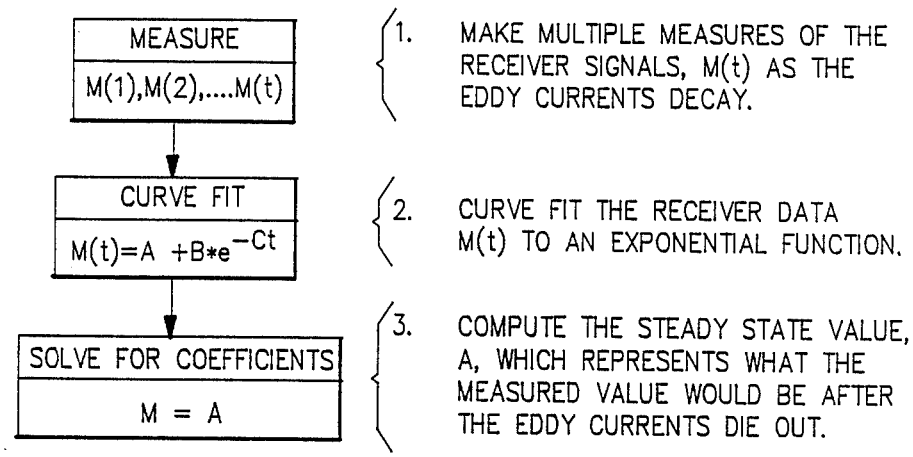

1. MAKE MULTIPLE MEASURES OF THE RECEIVER SIGNALS, M(t) AS THE EDDY CURRENTS DECAY.

2. CURVE FIT THE RECEIVER DATA M(t) TO AN EXPONENTIAL FUNCTION.

3. COMPUTE THE STEADY STATE VALUE, A, WHICH REPRESENTS WHAT THE MEASURED VALUE WOULD BE AFTER THE EDDY CURRENTS DIE OUT.

FIG.12

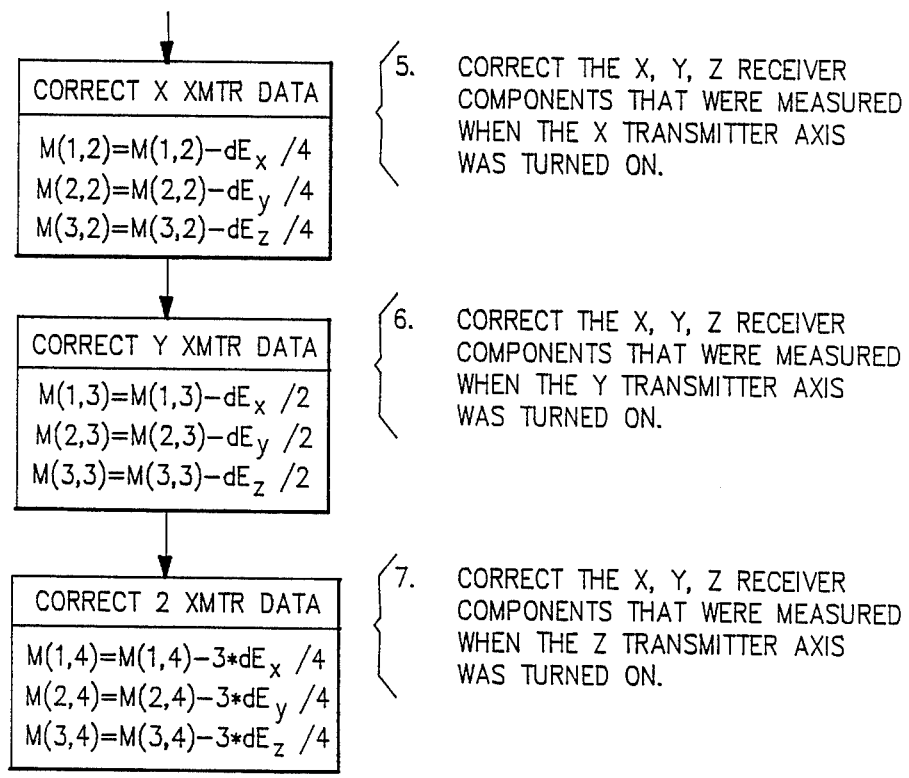

5. CORRECT THE X, Y, Z RECEIVER COMPONENTS THAT WERE MEASURED WHEN THE X TRANSMITTER AXIS WAS TURNED ON.

6. CORRECT THE X, Y, Z RECEIVER COMPONENTS THAT WERE MEASURED WHEN THE Y TRANSMITTER AXIS WAS TURNED ON.

7. CORRECT THE X, Y, Z RECEIVER COMPONENTS THAT WERE MEASURED WHEN THE Z TRANSMITTER AXIS WAS TURNED ON.

FIG.14/2

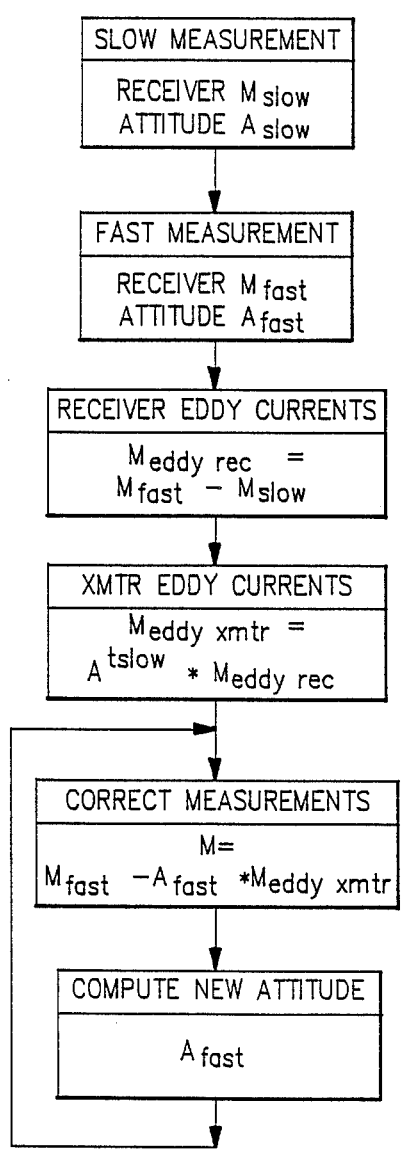

1. SLOW THE SYSTEM DOWN BY INCREASING THE AMOUNT OF TIME THE TRANSMITTER IS ON, RESULTING IN RECEIVER MEASUREMENTS WITHOUT EDDY CURRENTS.

2. SPEED THE SYSTEM UP TO ITS NORMAL OPERATING SPEED AND MEASURE THE RECEIVER DATA.

3. IN THE RECEIVER MEASUREMENT FRAME COMPUTE THE AMOUNT OF EDDY CURRENTS IN THE MEASUREMENTS.

4. COMPUTE EDDY CURRENT VECTOR IN THE TRANSMITTER REFERENCE FRAME AND STORE RESULTS IN MEMORY.

5. CORRECT ANY SUBSEQUENT FAST MEASUREMENTS AT THIS LOCATION TO ELIMINATE EDDY CURRENTS.

6. COMPUTE A NEW FAST ATTITUDE USING THE CORRECTED MEASUREMENT.

FIG.13

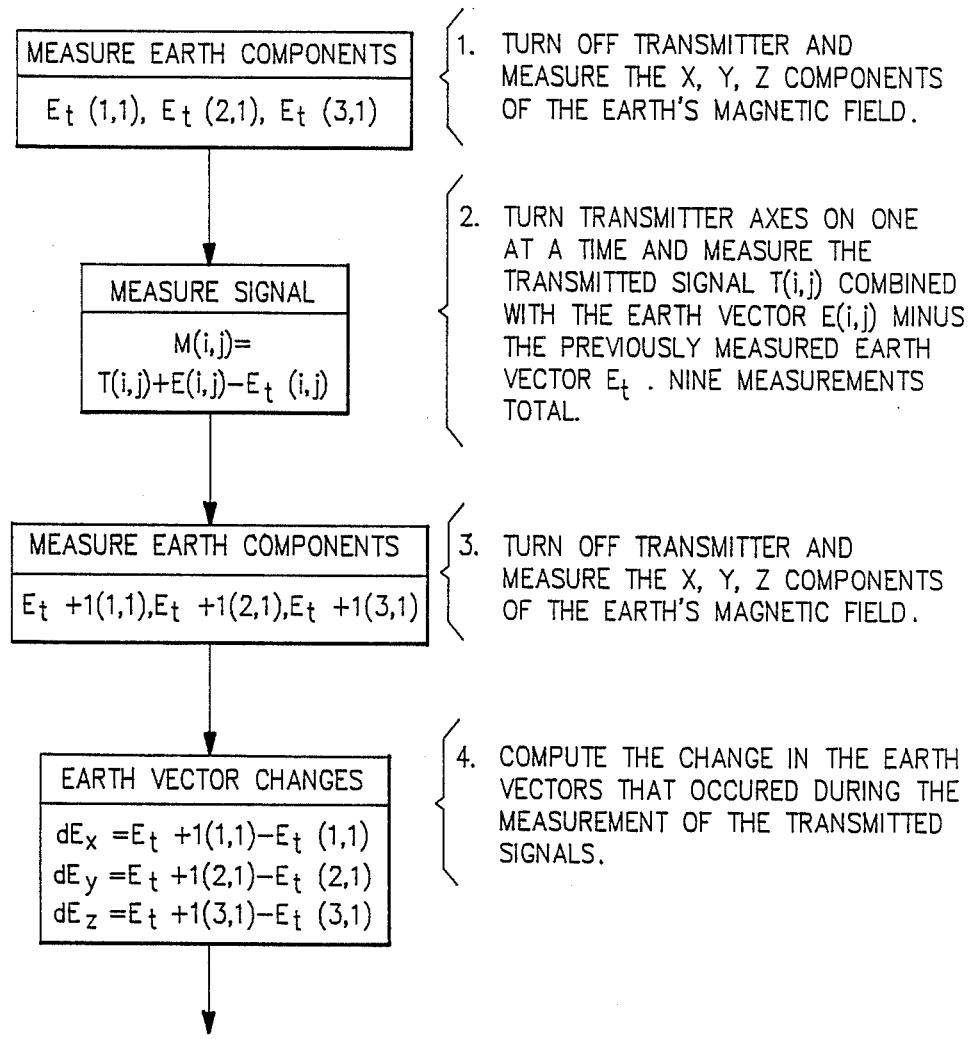
FIG.14/1

DEVICE FOR QUANTITATIVELY MEASURING THE RELATIVE POSITION AND ORIENTATION OF TWO BODIES IN THE PRESENCE OF METALS UTILIZING DIRECT CURRENT MAGNETIC FIELDS

This invention relates to devices for measuring the position of receiving antennae relative to transmitting antennae using direct current signals. Particularly, though not exclusively, the devices are for measuring that position in six degrees of freedom, namely, motion of translation in three coordinate directions (location) and rotational motion about three coordinate axes (orientation), location being commonly defined by X, Y and Z linear coordinates referring to three mutually perpendicular directions and orientation being commonly defined by pitch, roll and azimuth angular coordinates about three mutually perpendicular axes usually coincident with the three mutually perpendicular directions.

As used herein "position" means location and/or orientation location.

The concept of using transmitting and receiving components with electromagnetic coupling for measuring position (location and orientation) is well known especially with respect to armament sighting systems where the receiver component would be located in a gunner's helmet and a transmitter component would be attached to a nearby electrically non-conductive structure. As the gunner would sight-in a target through a sighting cross-hair affixed to his helmet, the receiver located thereupon would pick up signals generated by the transmitter. These signals would then be processed by a computer to determine the location and orientation of the helmet and then to contemporaneously point a unit of armament in the same direction as the helmet mounted sight piece. Prior art alternating (AC) magnetic field position measuring systems are typified by the following referenced patents which disclose the most pertinent AC position measuring systems known to the inventor of the present invention.

In U.S. Pat. No. 3,868,565 (Kuipers), U.S. Pat. No. 4,054,881 (Raab), U.S. Pat. No. 4,287,809 (Egli et al), U.S. Pat. No. 4,314,251 (Raab) and U.S. Pat. No. 4,396,885 (Constant), an AC signal is applied to produce a nutating magnetic field or is applied in a time division or frequency division format to a transmitter consisting of two or three orthogonal coils which generate an AC electromagnetic field which is measured by an AC receiver likewise consisting of three or two orthogonal coils. These sensed signals are then filtered and amplified in a method compatible with the transmitted format, converted to a digital format and then read into a computer where various mathematical methods are resorted to in order to extract position information with resort to applicable electromagnetic field equations.

Current systems such as the ones abovesaid that utilize an AC transmitted signal work accurately only when there are no electrically conductive materials located near either the transmitter or receiver because any transmitted AC signal would invariably induce eddy currents in these conductive materials which would in turn serve to generate an AC magnetic field that would distort any transmitted field, and, of course, any ultimate output location and orientation data. In fighter aircraft or helicopters where it is desired to use these location and orientation measuring systems, there are a lot of highly conductive materials in the form of aluminum, titanium, magnesium, stainless steel, and copper used in the construction. Compensation methods are taught in U.S. Pat. Nos. 4,287,809 and 4,394,831 (Egli et al). U.S. Pat. No. 4,287,809 teaches a method of compensating for the errors resulting from any field distortion due to cockpit metal that does not move with respect to the transmitter. The compensation method therein suggested involves making measurements throughout the cockpit to determine the amount of such distortion and then using this data to form a correction that is applied to the sensed signals. In a similar manner, U.S. Pat. No. 4,394,831 teaches a method to accomplish compensation for errors due to eddy currents induced in metal such as would be found in a display located on a pilot's helmet. This compensation method again requires initial experimental measurements of such distortion in order to effect necessary corrections and provides moderate improvements in accuracy only when the amount of metal on the helmet is concentrated in a single location and the helmet does not go through large angular rotations or translations in the cockpit. These types of compensation efforts that are required to make AC systems work accurately are time consuming and expensive to perform and only work in environments where there would not be too much conductive material near transmitter or receiver units. In many helicopters, for example, AC systems cannot be utilized at all because the distortions produced are simply too large to be corrected merely by such mapping.

Prior art permanent magnet position measuring systems are typified by the following referenced patents which disclose the most pertinent DC magnetic field position measuring systems known to the inventor of the present invention.

U.S. Pat. No. 4,197,885 (Lewin) discloses a system for measuring the location and attitude of a tooth or jaw with respect to the patient's head by attaching two permanent magnets to the tooth or jaw and having an array of magnetic flux detectors suspended in front of the patient's mouth. In U.S. Pat. No. 4,197,855:

(1) The flux generator is composed of two permanent magnets used to create an irregular magnetic field so that changes in signal strength can be interpreted as changes in position and orientation;

(2) The flux detector is an array of several dozen single axes detectors distributed over three orthogonal planar grids suspended in front of the patient's mouth;

(3) The device is capable of measuring only small displacements (less than an inch) and small rotations (a few degrees) with any accuracy; and (4) The reference frame, in this case the patient's head, cannot move while measurements are made because the flux detectors cannot differentiate between flux changes due to tooth/jaw movements and flux changes due to detector rotation in the earth's magnetic field.

U.S. Pat. No. 4,303,077 (Lewin) is the same device disclosed in U.S. Pat. No. 4,197,855 which is described above except for the following improvements:

(1) Access to the patient's mouth is improved by reducing the number of flux detectors from several dozen to six and mounting these detectors on a carrier;

(2) The flux detector sensitivity is improved by incorporating a flux concentrator into each detector; and (3) The electronics are reduced by multiplexing signals where appropriate.

U.S. Pat. No. 4,622,644 (Hansen) discloses a system for measuring the location and orientation of a permanent magnet. In U.S. Pat. No. 4,622,644:

(1) The flux generator is composed of one permanent magnet used to create a symmetric magnetic field from which location and orientation can be measured;

(2) The flux detector is an array of three, three axis antennae distributed in the space in which location and orientation measurements are desired;

(3) The location and orientation measurements are limited to five degrees of freedom since roll cannot be measured when the flux generator generates only a single symmetric field; and (4) The measurement reference frame cannot move while measurements are made because the flux detectors cannot differentiate between flux changes due to permanent magnet movements/rotations and flux changes due to reference frame rotation in the earth's magnetic field.

Attention is also drawn to the following:

A paper entitled "Determination of Depth of Shallowly Buried Objects by Electromagnetic Induction". By Yogadhish Das, John E. McFee, and Robert H. Chesney approved in IEEE Transactions On Geoscience And Remote Sensing. Vol. GE-23, No. 1 Jan. 1985. This paper described a traditional metal detector consisting of three coaxial coils of wire, one coil for transmitting a pulsed magnetic field which induces eddy currents in buried unexploded artillery shells, and two coils for detecting the resultant eddy current decay. Depth of the shell below the search coils is determined by measuring the induced voltage ratio between the two detector coils as a function of depth and the type of metal in the shell casing. This paper establishes that eddy currents decay rapidly when metal is pulsed with a magnetic field.

U.S. Pat. No. 3,027,951 (Knapp) which discloses a two-dimensional qualitative measuring device which uses direct current magnetic fields but which is incapable of quantitatively measuring location and provides no measurement at all of orientation. Knapp uses a single direct current generating device to obtain relative position data. In practice, this data is used to assist in aligning a drill bit in two dimensions with a submerged oil well opening. This device is no more than a relatively insensitive, null position-seeking device which indicates roughly that one body is to the left or right of another, but not how far in either direction. Knapp offers only a qualitative sense of position for the purposes of ultimately sensing a null locus between multiple single-axis sensors under restrictive constraints, thereby to provide a perpendicular alignment along the axis of the generated magnetic field. Moreover, Knapp provides no measure in space of one body relative to another or of orientation.

The instant device represents a radical departure from all of the prior art relating to such transmitting and receiving position and orientation devices, insomuch as it avoids, in-toto, resort to AC signals and instead relies upon DC signals. Such reliance on DC signals obviates completely any need for compensation and a priori calibration undertakings and greatly expands the potential utility of devices of this type.

It is an object of the present invention to provide a device for measuring quantitatively the position of receiving antennae relative to transmitting antennae without the aforesaid disadvantages of AC systems associated with the eddy currents induced in electrically conductive materials by the AC magnetic fields of these AC systems.

It is, more specifically, an object of the present invention to provide such a device which avoids the need for the aforesaid compensation and calibration associated with AC magnetic field systems and which is capable of implementation without concern for what types of diamagnetic or paramagnetic metallic materials as may be newly in use.

It is a further object of the present invention to provide such a device capable of such measurement in six degrees of freedom using pulsed DC magnetic fields.

It is a further object of the present invention to provide such a device which compensates for the effects of the earth's magnetic field.

It is a further object of the present invention to provide such a device capable of use in helicopters and other environments in which the distortions resulting from the presence of electrically conductive materials are too great for AC magnetic field systems to be used.

Another object of this invention would be to provide a computer graphics system with an effective three-dimensional "mouse". For instance, no longer will a graphics processor need to use one hand to control a "mouse" for length and width drafting on a computer screen and another hand to turn knobs to achieve image depth on such a screen. With this device, one hand can control all three dimensions on such a screen with respect to the drafting of images including image rotation as well, while the other hand would be free to perform other design tasks such as recording, drafting, et cetera.

The device of the present invention consists of a two- or three-axis transmitter driven by a pulsed DC current coupled with a three- or two-axis receiver that is sensitive to a transmitted DC magnetic field emanating from the abovesaid activated transmitter. Moreover, there are receiver signal processing electronics that control the receiver and serve to convert its output to a format suitable for processing by a digital computer in conjunction with a method for processing received signals so as to thereby develop position and orientation data.

According to the invention, there is provided a device for quantitatively measuring the position of receiver antennae relative to transmitter antennae comprising: transmitter antennae consisting of at least two aparallel antennae to generate at least two DC magnetic vectors; drive means for sequentially supplying said aparallel antennae with DC pulses to generate said DC magnetic vectors; receiver antennae consisting of at least two aparallel antennae to detect said DC magnetic vectors; the number of transmitter antennae times the number of receiver antennae being at least equal to the number of degrees of freedom of the desired quantitative measurement of the position of the receiver antennae relative to the transmitter antennae; means for compensating for the effects of the earth's magnetic field on the operation of the device and signal processing means to ascertain the magnitude of the detected DC magnetic vectors and to quantitatively compute said relative position from said received DC magnetic vectors.

The invention will now be described, by way of example, with reference to the accompanying drawings, in which:

FIG. 10 is a timing diagram showing the relationship between the transmitted and the received signals generated during simultaneous two-axis excitation of transmitter antenna of the present invention;

FIG. 11 illustrates the effect, on received pulses, of eddy currents produced by leading and trailing edge flux changes of the DC magnetic pulses produced by the transmitter in the presence of nearby metal;

FIG. 12 illustrates a method for the reduction of eddy current errors by exponential fit of receiver signal;

FIG. 13 illustrates a fast/slow measurement method of reducing errors due to eddy currents; and FIG. 14/1 and 14/2 together illustrate a method for the correction of receiver data when the earth's magnetic field is changing rapidly with respect to the receiver using an interpolation method.

Figure 1:
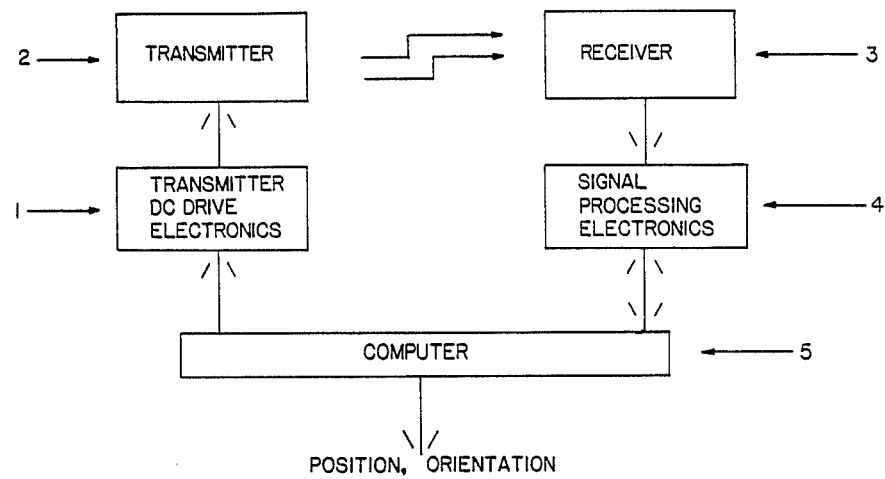
FIG. 1 is a block diagram of the disclosed invention.

FIG. 1 depicts the major elements of the disclosed invention. The magnetic position (location and orientation) measuring system consists of: a Transmitter Driver Circuit 1 for providing a controlled amount of DC current to each of two or three axes of Transmitter 2 one at a time. The amount of DC current provided by Driver 1 to the Transmitter axis to which it is provided is controlled by Computer 5. Transmitter 2 is usually attached to the cockpit structure of an aircraft or helicopter and would be located within a few feet of distance from a pilot's head in its military application, or in its computer graphics application, Transmitter 2 would be located on, under, or above any table where a computer graphics user would be working. Transmitter 2 consists of two or three individual antennae arranged concentrically which generate a multiplicity of DC magnetic fields that are picked up by Receiver 3. Receiver 3 measures not only the fields generated by Transmitter 2 but also the earth's magnetic field to thereby effect an ultimate measure of the position and orientation of the object to which it is attached. In the military application, this is usually the pilot's helmet. In the computer graphics application, Receiver 3 is usually hand-held. Receiver 3 consists of three or two axes with detecting circuits that are sensitive to DC magnetic fields. The DC signal output from Receiver 3 goes to the Signal Processing Electronics 4. Signal Processing Electronics 4 controls, conditions, and converts analog receiver signals into a digital format that can be read by Computer 5. Computer 5, by way of an algorithm, such as the one detailed in FIG. 6 below, computes the position and orientation of Receiver 3 with respect to Transmitter 2. Computer 5 then outputs this information to an aircraft's armament control computer or, in computer graphics application, to a graphic image controller.

Figure 2:
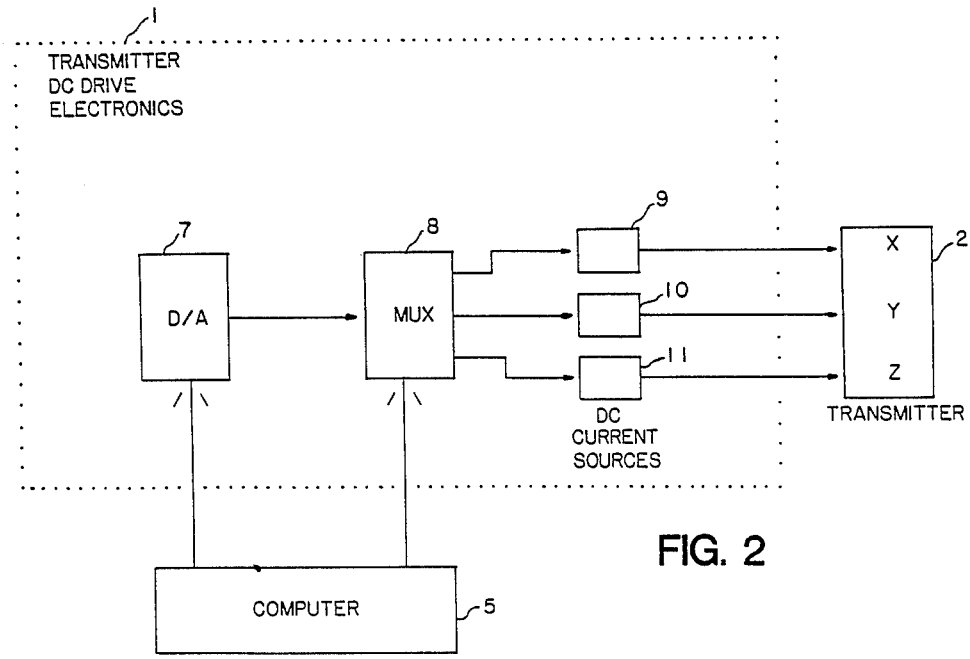
FIG. 2 is a block diagram of the transmitter driver electronics, which constitute an integral part of the disclosed invention.

FIG. 2 presents the details of the Transmitter Drive Electronics 1. The purpose of the Transmitter Drive Electronics 1 is to provide DC current pulses to each antennae of Transmitter 2, one antenna at a time. While a given Transmitter 2, antennae is being provided with current, readings are taken from the antennae of Receiver 3. For a Transmitter 2 composed of three antenna (X, Y, and Z axis antennae) and a Receiver 3 also composed of three antennae (X, Y, and Z axis antenna), there would be nine readings of the transmitted signal. Transmitter 2 is initially shut off and Receiver 3 measures the X, Y, and Z components of the earth's magnetic field. In respect of the operation of the Transmitter DC Drive Electronics, Computer 5 sends to the Digital to Analog (D/A) Converter 7 a digital number that represents the amplitude of the current pulses to be sent to the selected transmitted antenna. The D/A Converter 7 converts this digital representation of the amplitude to an analog control voltage. This control voltage goes to the Multiplexer (MUX) 8 which connects or switches the control voltage to one of the Current Sources 9, 10, or 11 as directed by Computer 5 when it is desired to transmit on the X, Y, or Z transmitter axis. Current Sources, 9, 10, and 11 are identical. Their purpose is to provide a DC current to the Transmitter 2's antennae one at a time. The amplitude of such current so provided is proportional to the input control voltage generated by the D/A 7. Construction details for said DC current sources are not presented here because they are well known to one skilled in the art. An alternative arrangement is to provide a transmitter driver having one current source and a multiplexer located between the current source and the antennae.

Figure 3:
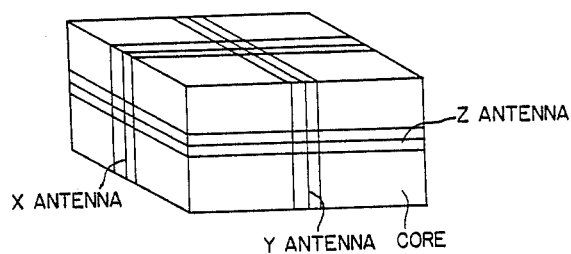
FIG. 3 shows the construction of the transmitter component of the instant invention.

Transmitter 2 as shown in FIG. 3 consists of a core about which X, Y, and/or Z antennae are wound. The core can be constructed of air, but is usually constructed of magnetically permeable ferrite that concentrates the magnetic flux at any given location around the antenna. Ferrite is an expensive material, very fragile and difficult to shape but must be used in the cores of systems that use an AC signal format because its eddy current losses are very low. For Transmitter 2 herein disclosed there are no AC signal components in its steady state signal and the core can therefore be and has been constructed of very inexpensive iron or steel and obtain the same flux concentration as the more expensive ferrite. The antenna windings of Transmitter 2 consist of multiple turns of standard magnetic wire. The size of the wire, the number of turns, and the enclosed area of the antenna winding, are determined by methods well known to those skilled in the art of designing antennae. Transmitter 2 generates a near field signal strength variation of the order of 1/R3 (R equalling the distance between Transmitter 2 and Receiver 3 at any one instant in time).

Receiver 3 consists of three or two antennae arranged approximately orthogonal to each other with detecting circuits. Each antenna is capable of measuring a DC magnetic field. There are many technologies available for use as a DC Receiver 3. A representative embodiment of Receiver 3 would be the three axis toroidal fluxagate magnetometer detailed in U.S. Pat. No. 3,800,213 (Rorden). Other representative embodiments would be other DC field sensitive technologies that may also be used for Receiver 3: including thin film magnetometers as detailed in U.S. Pat. No. 3,942,258 (Stucki et al) or zero magnetostrictive amorphous ribbon magnetometers as detailed in "Magnetometers Using Two Amorphous Core Multiviborator Bridge" by K. Mohri et al. in IEEE Transactions on Magnetics, Vol. MAG-19, No. 5, Sept. 1983, or Hall effect based DC sensors as detailed in "Low Field Hall Effect Magnetometry" by P. Daniil and E. Cohen in J. Appl. Phys. 53(11), Nov. 1982; or a fiberoptic magnetometer as detailed in "Phase Shift Nulling DC-Field Fibreoptic Magnetometer" by A. D. Kersey, et al., in Electronic Letters Vol. 20 No. 14 (July 1984), or semiconductor based magnetic field sensors and transistors as described in "Silicon Micro-Transducers," by S. Middlehoek and D. J. W. Noorlag in The Journal of Physics, E: Scientific Instruments, Vol. 14 (1981), or the permalloy based magnetoresistive sensors as described in "The Permalloy Magnetoresistive Sensors - Properties and Applications" by W. Kwiatowksi and S. Tumanski, The Journal of Physics, E: Scientific Instruments, Vol. 19, No. 7 (July 1986); or piezolelectrical crystal receivers such as would be depicted in a patent of R. Pittmann, "Apparatus for measuring the strength and direction of Magnetic fields utilizing a Piezoelectric Crystal" (U.S. Pat. No. 3,564,402). There are many variations of such DC sensors detailed in the open literature and there are many other methods that are well known to those skilled in the art. For the subject application where one desires to measure a transmitted magnetic field that is superimposed on top of the earth's magnetic field, an arrangement such as taught in U.S. Pat. No. 2,485,847 allows one to cancel the earth's field right at Receiver 3's antenna thus allowing one to make a more sensitive measure of the transmitted fields deviation from the earth's field. The output from Receiver 3 goes to Signal Processing Electronics 4 because the abovesaid technologies are well known, no drawing of a Receiver 3 is herein submitted.

Figure 4:
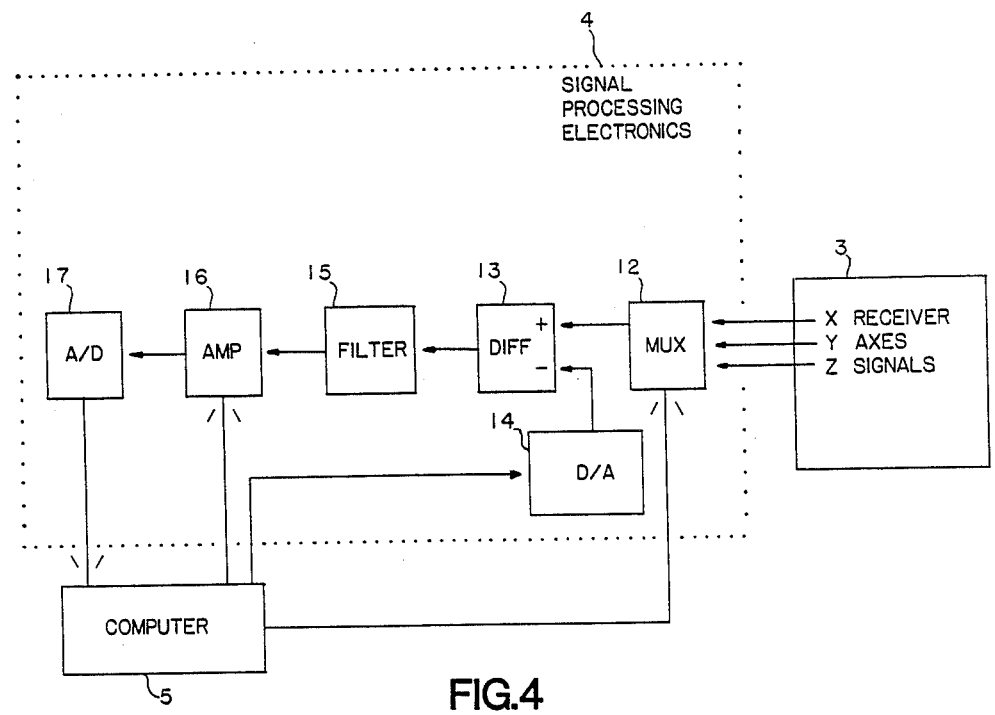
FIG. 4 is a block diagram of the receiver signal processing electronics that constitute an integral part of the disclosed invention.

As detailed in FIG. 4, the Signal Processing Electronics 4 consisting of a Multiplexer (MUX) 12, which switches on, via command from Computer 5, the desired X, Y, or Z detected antenna signal, one at a time, to Differential Amplifier (DIFF) 13. Differential Amplifier 13 subtracts from this antenna signal the previously measured component of the earth's magnetic field, outputting only that part of the received signal that is due to the transmitted field. This earth's magnetic field component would have been stored in Computer 5 during a previous measurement cycle and sent to Differential Amplifier 13 via Digital to Analog Converter (D/A) 14. The output from Differential Amplifier 13 is then filtered by Filter 15 to remove noise and is amplified by Amplifier 16. Computer 5 sets the gain of Amplifier 16 to the maximum value possible such that Receiver 3's signal will not exceed the limits of Analog to Digital Converter (A/D) 17. The Analog to Digital Converter (A/D) 17 then converts the received DC signal to a digital format that can be read by Computer 5.

Figure 5:
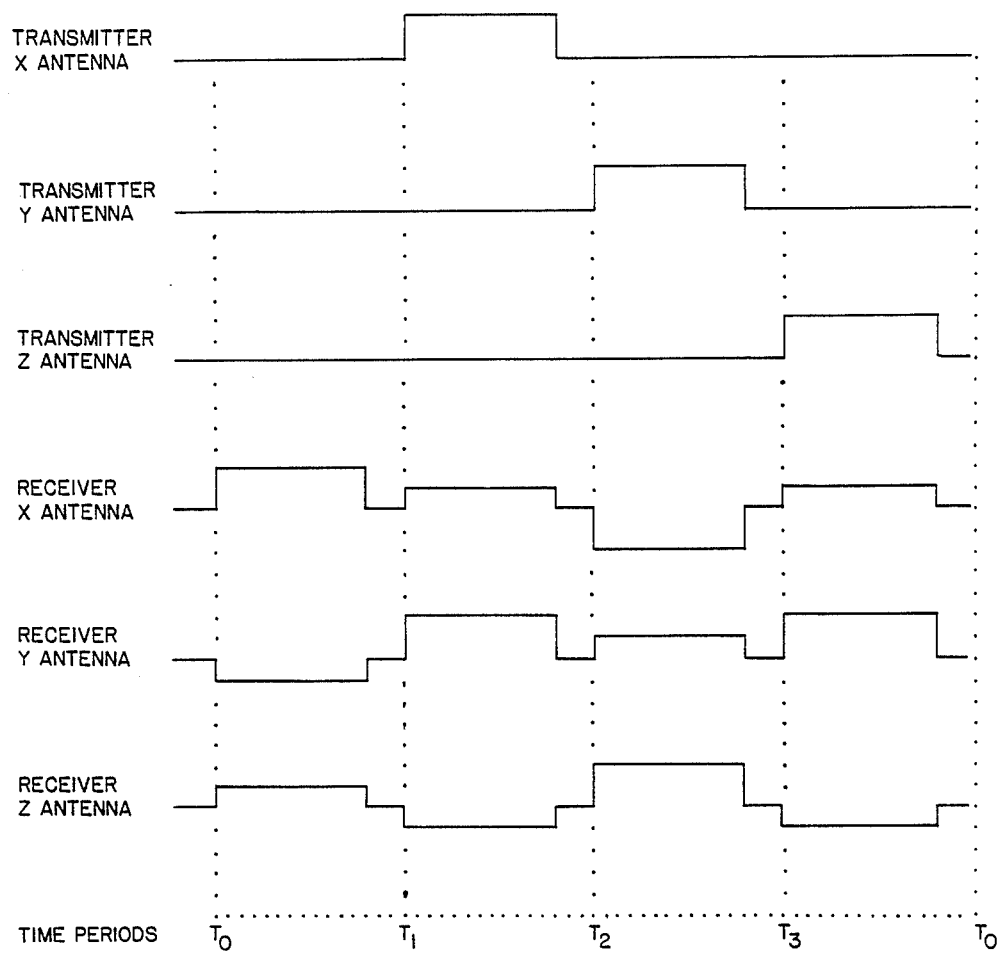
FIG. 5 is a timing diagram showing the relationship between the transmitted and received signals generated during any use of the disclosed invention.

FIG. 5 shows the timing relationship between the current pulses provided by Transmitter Driver 1 to Transmitter 2 and the signals received by Receiver 3. As shown therein, the transmitting and receiving sequence begins at time $T_0$ with all three Transmitter 2 antennae shut off. During the time period $T_0$ to $T_1$, the X, Y, and Z components of the earth's magnetic field are measured by Received 3 and read into Computer 5. Computer 5 outputs these earth field values to Signal Processing Electronics 4 where they are subtracted from the nine measured values generated when Transmitter 2's X, Y, and Z antennae are turned on. At the $T_1$ a current pulse is supplied only to the X Antenna of Transmitter 2. After a period of time, sufficient for eddy currents to die out, a DC magnetic field will be established about Transmitter 2's X antenna that is free of distortions due to eddy currents. As shown in FIG. 5, Receiver 3's X, Y, and Z antennae will measure the X, Y, and Z components of this transmitted magnetic field plus the earth's magnetic field during the period $T_1$ to $T_2$, the amplitude of the measured signals being a function of the position and orientation of Receiver 3's antennae with respect to Transmitter 2's X antenna and the location and orientation of Receiver 3 on the earth's surface. During the $T_1$ to $T_2$ period, the earth's field is subtracted from Receiver 3's X, Y, and Z signals and the resulting analog signals are conditioned and converted to a digital format by the Receiver Signal Processing Electronics 4 and read into Computer 5 and then the X antenna of Transmitter 2 is turned off. At time $T_2$, a current pulse is applied to Transmitter 2's Y antenna and again Receiver 3's X, Y, and Z antennae values are read into Computer 5 during the period $T_2$ to $T_3$. Starting at time $T_3$, the same process is repeated for Transmitter 2's Z antenna. At the end of this period, twelve receiver values will have been read into Computer 5; three earth field components and three receiver values for each of the three transmitter antennae. The entire sequence of turning on Transmitter X, Y, and Z antenna then repeats itself as above, continuing as long as measurements are required.

Figure 6:
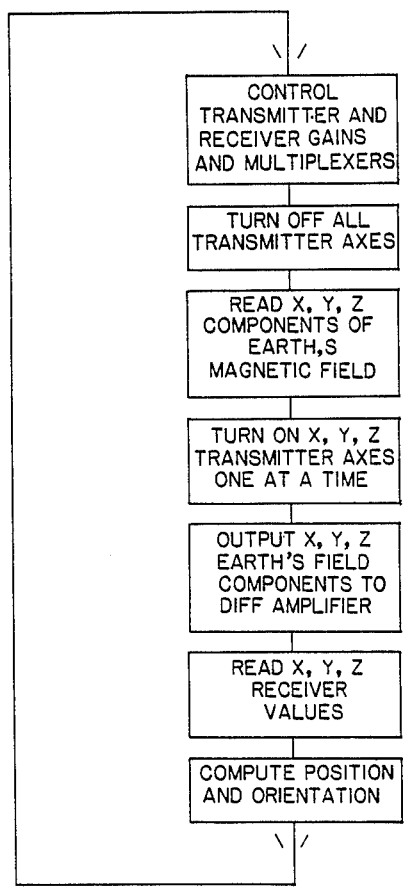
FIG. 6 is a diagram of computational and control task sequences as performed by the computer components of this device.

FIG. 6 summarizes the computational and control task sequences performed by Computer 5 in controlling the hardware elements 7, 8, 12, 14, and 16 and in converting the received data into location and orientation outputs.

The twelve data items measured by the system can be represented by the following matrix:

$$M = \begin{vmatrix} E(1,1) & M(1,2) & M(1,3) & M(1,4) \\ E(2,1) & M(2,2) & M(2,3) & M(2,4) \\ E(3,1) & M(3,2) & M(3,3) & M(3,4) \end{vmatrix}$$

Where the elements in each row represent the values measured by the X, Y, and Z axes of the receiver 3 and the elements in the each column represent the receiver data measured for a given transmitter 2 axes condition, that is elements in the first column represent the components of the earth's magnetic field measured when the three transmitter 2 axes were turned off while the last three columns represent data measured by the receiver minus the earth's field when X, Y, and Z transmitter 2 axes were turned on one at a time. For example, M(2,2) represents the Y receiver axis value measured when the X transmitter axis was turned on minus the Y component of the earth's magnetic field (E(2,1)).

Since the elements in the last three columns represent the signals one would measure from a transmitter 2 if there was no earth's field present, the location and orientation of the receiver 3 with respect to the transmitter can be extracted from these nine elements through the use of any one of the many algorithms known to those skilled in the art. For example, the algorithms detailed in U.S. Pat. No. 4,287,809 or U.S. Pat. No. 4,314,251 will produce the desired location and orientation information. The algorithm given below follows that detailed in "SPASYN-An Electromagnetic Relative Position And Orientation Tracking System" by Jack B. Kuipers, IEEE Transactions On Instrumentation And Measurement, Vol. IM-29, No. 4, Dec. 1980. Notation follows Kuipers except where addition detail is provided.

Compute X, Y, and Z position by first forming $$U = S^t S$$

where S represents the 3×3 matrix of receiver signals with the earth's field subtracted and corrected for transmitter and receiver imperfections as detailed in "Magnetic Position And Orientation Tracking System" by F. H. Raab, E. B. Blood, T. O. Steiner, and H. R. Jones, IEEE Transactions On Aerospace And Electronic Systems Vol. AES-15, No. 5 Sept. 1979. $S^t$ is the matrix transpose of S. U is symmetric matrix and a function of only the tracking angles (Kuipers notation).

If we represent U as $$U = \begin{vmatrix} U11 & U12 & U13 \\ U21 & U22 & U23 \\ U31 & U32 & U33 \end{vmatrix}$$

Then in terms of the tracking angles alpha (a) and beta (b) the elements of the U matrix are $$U11 = 3*COS^2(a)*COS^2(b) + 1$$

$$U21 = U12 = 3*SIN(a)*COS(a)*COS^2(b)$$

$$U31 = U13 = -3*COS(a)*SIN(b)*COS(b)$$

$$U22 = 3*SIN^2(a)*COS^2(b) + 1$$

$$U32 = U23 = -3*SIN(a)*SIN(b)*COS(b)$$

$$U33 = 2*SIN^2(b) - COS^2(b) + 1$$

Or in terms of the cartesian coordinates X, Y, Z where $$X/R = COS(a)*COS(b)$$

$$Y/R = SIN(a)*COS(b)$$

$$Z/R = -SIN(b)$$

Where R is the range from the transmitter to the receiver Substituting, one obtains $$U = 3/R^6 \begin{vmatrix} (X/R)^2 + \tfrac{1}{3} & (X/R)*(Y/R) & (X/R)*(Z/R) \\ (X/R)*(Y/R) & (Y/R)^2 + \tfrac{1}{3} & (Y/R)*(Z/R) \\ (X/R)*(Z/R) & (Y/R)*(Z/R) & (Z/R)^2 + \tfrac{1}{3} \end{vmatrix}$$

From which X/R, Y/R, Z/R may be extracted.

R may be computed from S knowing that the total vector of S is proportional to $1/R^3$ where the proportionality factor is a function of transmitted signal strength and receiver sensitivity and gain. Knowing R one may solve for the X, Y, Z receiver location.

The Receiver attitude matrix (A) may then be solved for from $$A = (U - 2*I)^{-1}*S$$

where I represents the identity matrix.

When A is normalized its elements represent the following standard directional cosine rotation matrix.

$$A = \begin{vmatrix} Cos(P)*Cos(Y) & Cos(P)*Sin(Y) & -Sin(P) \\ -Cos(R)*Sin(Y) & Cos(R)*Cos(Y) & Sin(R)*Cos(P) \\ Sin(R)*Sin(P)*Cos(Y) & Sin(R)*Sin(P)*Sin(Y) & \\ Sin(R)*Sin(Y) & -Sin(R)*Cos(Y) & Cos(R)*Cos(P) \\ Cos(R)*Sin(P)*Cos(Y) & Cos(R)*Sin(P)*Sin(Y) & \end{vmatrix}$$

where R = roll, P = pitch, Y = yaw

LOW FREQUENCY NOISE REJECTION

For a DC system to measure the earth's magnetic field and the transmitted DC signals, the signal filters in its electronic circuitry must have a bandwidth that extends from zero hertz to approximately five times the measurement cycle rate. Where one measurement cycle consists of the sum of the time that the transmitter is off to read the earth's field and then on to read the signals resulting from the X, Y, Z axis transmitted signals. Thus if the system is designed to make five measurements per second then the filter bandwidth needs to extend from 0 to 25 Hz. Thus to make one hundred measurements per second then the bandwidth needs to extend from 0 to approximately 500 Hz.

As with all types of receivers, if there is another signal in the air whose frequency falls within the bandwidth used and whose amplitude is above the measurement threshold then the receiver will measure this signal in addition to the desired signal resulting in interference. This interference will manifest itself as noisy or inaccurate position and orientation measurements. The major interfering signals that the DC system has to contend with emanates from power lines and power transformers from nearby electronic equipment. This interference takes the form of the 50 Hz, 60 Hz, or 400 Hz power line frequencies used in, for example, the U.S., Europe, or in military vehicles.

The traditional approach to solving the interference problem is to add a notch or low pass filter to the receiver electronics. This is the simplest and most effective approach to get rid of the unwanted signals. However, the low pass filter can only be used when the interfering signals are outside the bandwidth required to pass the desired signals and the notch requires a complicated circuit configuration and/or a long settling time compared to the time the receiver channel is selected. For the pulsed DC system this means that to reduce interfering 60 Hz power line signals by a factor of 10 the upper limit of the measurement rate is approximately 10 measurements/sec. To reduce 400 Hz power line signals the upper limit of the measurement rate to approximately 66 measurements/sec.

Figure 7:
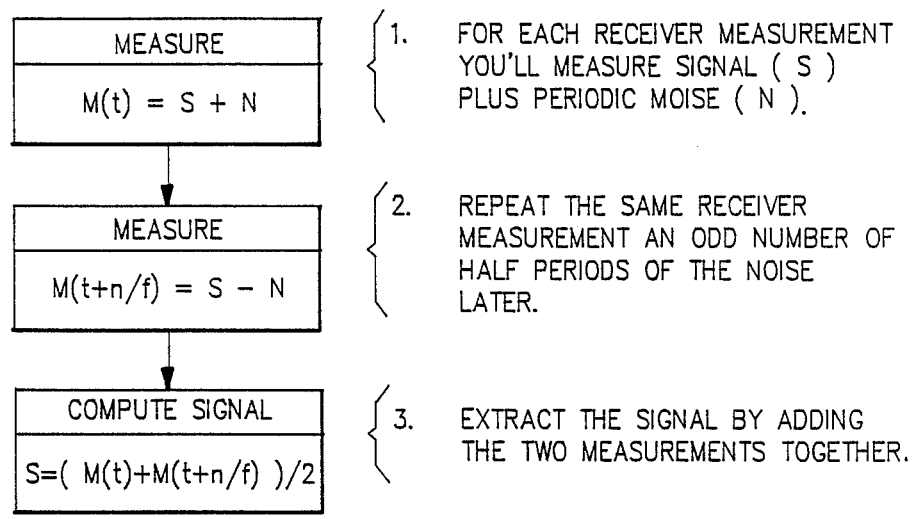
FIG. 7 illustrates a procedure to reduce noise by making successive measurement separated by a time equal to half the period of the periodic noise. Measurement is not necessarily synchronous with the zero crossing to the noise.

For fastener measurements an approach other than the electronic filter must be employed. The approach used in the present pulsed DC system utilizes the fact that the interfering signal is sinusoidal and of a known frequency. If the sinusoid is looked on as noise (N) riding on top of the desired signal (s) then if the measurements are made at twice the frequency of the sinusoid, the first measurement will consist of S+N and the second measurement will consist of S−N. Thus if these two measurements added together, the noise cancels out and the desired signal is left. FIG. 7 illustrates the logic sequence of this method. For a 60 Hz interfering noise source this means that the pulsed DC system cycle time can be adjusted to any one of several discrete values as long as it repeats at odd multiples of twice the power line frequency, that is the cycle time in seconds can be 1/(1*0.00833), 1/(3*0.00833), 1/(5*0.00833), etc. or the equivalent measurement rate can be 120, 40, 24, etc. measurements/sec for 60 Hz rejection. For 50 Hz rejection some of the viable cycle times are 1/(1*0.01), 1/(3*0.01), 1/(5*0.01) or the equivalent measurement rates of 100, 33, and 20 measurements/sec. For 400 Hz rejection some of the viable cycle times are 1/(7*0.00125), 1/(9*0.00125), 1/(11*0.00125), or the equivalent measurement rates are 114, 89, and 73 measurements/sec. At this higher line frequency it is also viable to do multiple sampling with 0.00125 seconds between the samples to reject the 400 Hz signals. For example, when the X transmitter axis is turned on read the X, Y and Z receiver axis, wait for 0.00125 seconds to pass from the start the X, Y, and Z sampling and then make another set of X, Y, Z receiver readings and add the two sets together to reject the 400 Hz.

Figure 8:
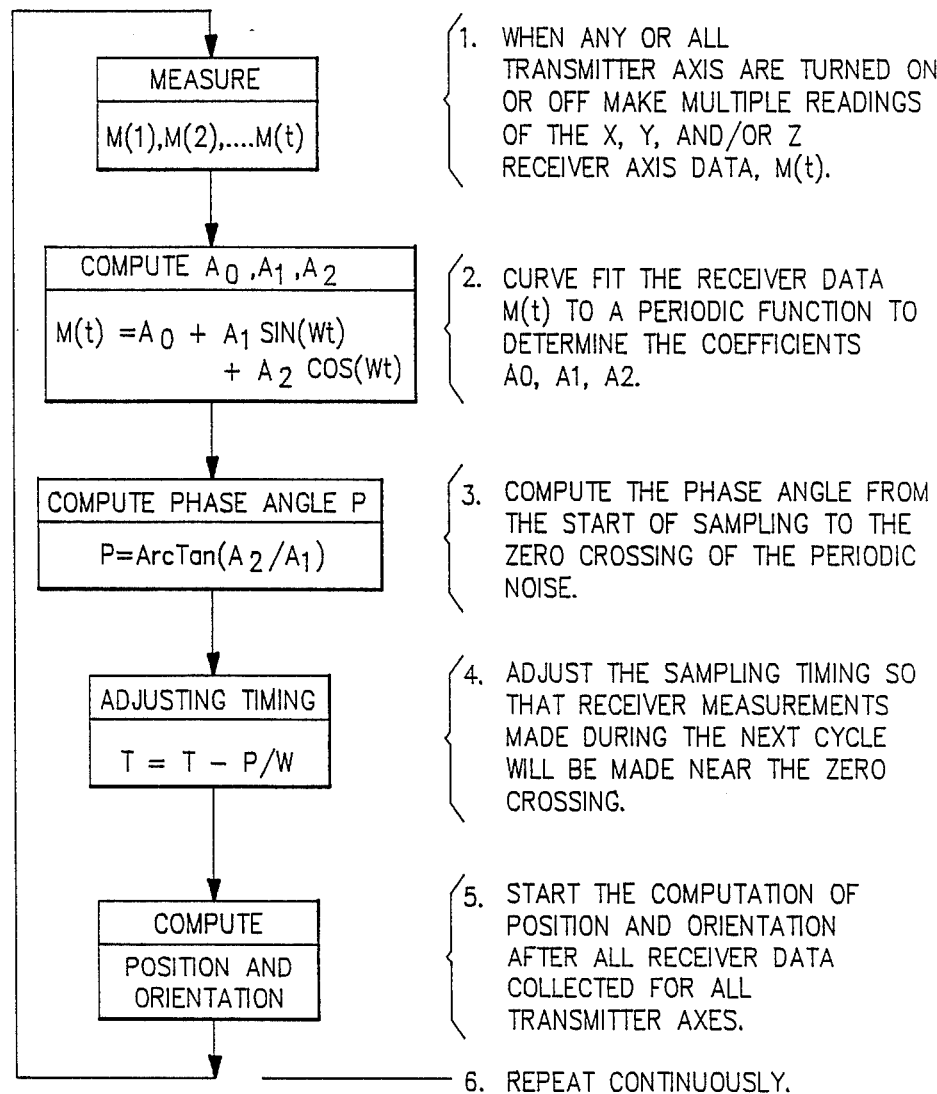
FIG. 8 illustrates one of many software methods for determining the zero crossing of the low frequency periodic noise that corrupts the receiver measurements.

Low frequency AC noise can be further reduced by making use of the fact that if an AC noise source is on top of a DC signal then it is better to make DC measurements at or near the zero crossing of the AC noise since this is where the noise interference is minimum. Further, if successive cycle readings are made on the odd crossings of the AC noise as described in the paragraph above then adding these successive cycles together will further reduce the noise. Zero crossing can be determined by hardware or software means and many methods are taught in the literature. For example, in hardware, it is possible to AC couple the X receiver axis and monitor it when the transmitter is off using a crossing detector. Software detection could be done with multiple signal samples that are curve fit to a sine curve for determining amplitude and phase and hence the timing of the zero crossing of the noise. FIG. 8 illustrates the logic sequence of a software method of determining zero crossing of periodic noise.

Figure 9:
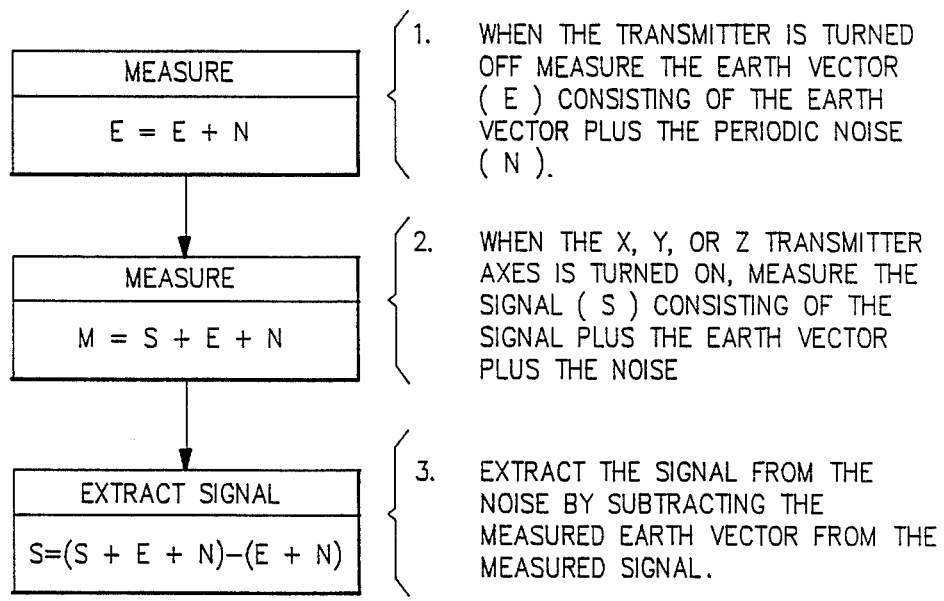
FIG. 9 illustrates a procedure to reduce noise by making successive measurements separated by a time equal to the period of the periodic noise. Measurement is not necessarily synchronous with the zero crossing to the noise.

An additional approach that can be used to extract receiver signal measurements (S) from the sinusoidal noise (N) is by making receiver axes measurements for each transmitter axes (off, X, Y, Z) when sequentially energized at a rate equal to the frequency of the noise. In this case, the noise will be treated as if it was part of the earth's vector (E) and subtracted from the signal as part of the normal signal processing. For example, for a 400 Hz sinusoidal noise source when the transmitter is first turned off and the Earth's vector is measured, the system will measure E+N. When the X transmitter axes is then turned on 2.5 milliseconds (the period of the 400 hz noise) after the start of the period when the transmitter was turned off then the receiver will measure S+N+E. Thus, when the earth's vector consisting now of E+N is subtracted from the transmitted signal one is left with just the desired signal $S=(S+N+E)-(N+E)$. FIG. 9 illustrates the logical sequence of the method.

An additional approach for extracting a DC signal that has an AC interfering signal riding on top of it uses the principle of integrating the signal using software or hardware means for one or more integer periods of the interfering signal. The result of this integration will be the desired DC level. Software and hardware integration methods are well known to those skilled in the art.

Because DC systems are susceptible to interference from low frequency signals such as those from power lines, the designer must try to maximize the transmitted signal to noise ratio. One method of doing this is of course to just increase the amount of current in the transmitter antennae as they are turned on one at a time. The amount of current that can be put into a given coil is limited by the coil wire size and the increased amount of time required for the transmitter to settle to the higher current level.

A new and useful way to obtain an increased signal to noise while eliminating the requirement to increase wire size or increase the current level in a given transmitter axes is to turn on current to two transmitter antennae at the same time. For a given current level in each antennae individually the two antennae approach results in forty percent more output signal from the transmitter than the single antenna approach.

An additional advantage of using two antennae at a time over one is that for a given signal strength at the receiver the two approach requires thirty percent less current in each transmitter antennae. This reduced current level means that the time to turn on a given transmitter antenna and get it settled at the required current level is reduced by approximately thirty percent and additionally the components used in the current driver can be of a lower current rating, resulting in a savings in component cost and component heat sinking.

Since to obtain a six degree of freedom solution at least six measurements are needed, at least two or three combinations of the X, Y, Z transmitter antennae must be turned on two at a time. For example, to generate three transmitted vectors at the receiver the X and Y antennae are turned on at the same time, then the Y and Z antennae at the same time, and then the Z and X antennae at the same time.

The hardware requirements differ only in the switching necessary to turn on two transmitter axes at a time instead of one.

A new algorithm is required to solve for position and orientation when two axes are at a time. Such an algorithm is readily derivable by those skilled in the art and will not, therefore, be detailed here.

FIG. 10 shows the timing relationship between the current pulses provided by the transmitter driver 1 to the transmitter 2 and the signals received by the receiver 3. As shown in FIG. 10, the transmitting and receiving sequence begins at time $T_0$ with all three transmitter antennae shut off. During the time period $T_0$ to $T_1$ the X, Y, and Z components of the earth's magnetic field are measured by the receiver 3 and read into the computer 5. The computer 5 outputs these earth field values to the signal processing electronics 4 where they are subtracted from the nine measured values generated when the transmitter's X, Y, and Z antennae are turned on. Starting a time $T_1$ and continuing through time $T_0$ the transmitter axes are turned on two at a time in any non-repeating sequence. The following describes one possible sequence. At time $T_1$ a current pulse is supplied to both the X and Y transmitter antenna. After a period of time, sufficient for eddy currents to die out, a DC magnetic field will be established about the transmitter's X and Y axes that is free of distortions due to these eddy currents. As shown in FIG.

10, the receiver's X, Y, and Z antenna will measure the X, Y, and Z components of this transmitted magnetic field plus the earth's magnetic field during the period $T_1$ to $T_2$. The amplitude of the measured signals being a function of the position and orientation of the receiver's antennae with respect to the transmitter's X and Y antenna and the location and orientation of the receiver on the earth's surface. During the $T_1$ to $T_2$ period the earth's field is subtracted from the receiver's X, Y and Z signals and the resulting analog signals are conditioned and converted to a digital format by the receiver signal processing electronics 4 and read into the computer 5 and then the X transmitter antenna is turned off and the Y transmitter is left on. At time $T_2$ a current pulse is applied to the transmitter's Z antenna resulting in magnetic fields being established about the transmitter's Y and Z antenna and again the receiver's X, Y, and Z antenna values are read into the computer during the period $T_2$ to $T_3$. Starting at time $T_3$ the transmitter's Y antenna is shut off and the X antenna turned on resulting in magnetic fields being established about the transmitter's Z and X antenna and again the receiver's X, Y, and Z antenna values are read into the computer. At the end of this period twelve receiver values will have been read into the computer, three earth field components and three receiver values for each of the three combinations of two transmitter antenna. The entire sequence of turning on the transmitter X, Y and Y, Z and Z, X antenna then repeats itself as above, continuing as long as measurements are required.

INCREASING THE MEASUREMENT RATE IN THE PRESENCE OF METAL

When a DC current pulse is applied to a transmitter antenna the rising and falling edges of the resultant magnetic field pulse induces eddy currents in nearby metals. Between the rising and falling edges no additional eddy currents are generated because the flux is not changing. FIG. 11 shows several idealized wave forms to illustrate this point. The first wave form is the resultant magnetic flux pulses as a function of time as the transmitter is turned on and off. The second wave form is an idealized representation of the voltage induced in one of the receiver axes as the transmitter is pulsed and there is no nearby metal. The third wave form shows the receiver output when there is nearby metal. In this case, the receiver is measuring both the transmitted flux and the flux resulting from eddy currents. As the wave form shows, after the initial burst of eddy currents, the received signal is eddy current free. The last wave form shows just the eddy current portion of the received signal. This is what would be measured if the receiver was only sensitive to an AC signal.

As explained in "Feasibility of Discriminating Between Buried Metallic Spheroids by Classification of Their Electromagnetic Response" by R. H. Chesney, Master of Applied Science Thesis, The University Of British Columbia, Sept. 1982, The initial amplitude of the induced eddy currents is proportional to SIZE/(CONDUCTIVITY*$D_{tm}^3$*$D_{mr}^3$) where SIZE is a measure of the size (area) the object that the transmitter sees, CONDUCTIVITY is an electrical characteristic of the metal generating the eddy current, $D_{tm}$ is the distance from the transmitter to the metal and $D_{mr}$ is the distance from the metal to the receiver. When the steady state value of the pulse is reached no additional eddy currents are induced and the existing eddy currents start to decay exponentially where the time constant of this decay is proportional to 1/(SIZE * CONDUCTIVITY * PERMEABILITY) where the PERMEABILITY is a magnetic characteristic of the metal generating the eddy currents. The present pulsed DC system implementation either waits enough time for the eddy currents to die out before measuring the transmitted flux to obtain an error free measurement or measures the signal earlier at a point in time where the errors resulting from eddy currents are still acceptable for the given application.

The improvements herein disclosed deal with methods of reducing the errors caused by eddy currents when it is necessary to measure the transmitted signal before the eddy currents die out. Two methods are discussed, the first utilizes the decay characteristics of the eddy currents and the second approach measures the amplitude of the eddy current contribution.

In the first approach the received signal is measured several times as the eddy current is dying out and this data are curve fit to an exponential decay math function to ascertain the exponential decay function. This function is then either extrapolated ahead in time until the zero slope point of the function is reached, indicating that the eddy currents have died out, or is extrapolated ahead a lesser amount dependent on the acceptable error level for the application. Ideally, the math function would be exponential in nature like the following: $M = A + B^* e^{-c^* t}$ or for computational simplicity might be of the form $M = A + B/(t-c)$. Where A, B, C are constants determined by the process of fitting the data to the functional form, and t represents time. The details of selecting a functional form, curve fitting and extrapolating are not presented since they are well known to those skilled in the art. FIG. 12 illustrates the logical steps of this first method.

The second approach of compensating for eddy currents resulting from metal that does not move with respect to the transmitter is based on two principles: (1) The X, Y, Z components of the eddy currents measured in the reference frame defined by the X, Y, Z transmitter antenna are dependent only on the location of the measuring receiver with respect to the transmitter and not the orientation of the measuring receiver. (2) For any conductive metal environment a receiver measurement can be made that is free of eddy currents if the transmitter pulse is held on long enough. The compensation process then involves: (1) When the receiver's location is stationary or changing slowly, the system is slowed down by increasing the amount of time the transmitted pulse is on until there are no eddy currents. An error free measurement from all receiver axes is then made ($M_{slow}$) and an error free computation of the receiver attitude ($A_{slow}$) and location is made using $M_{slow}$. The transmitter pulse length is then shortened so that the desired fast measurements ($M_{fast}$) are made although these fast measurements then contain eddy current distortion. (2) The amount of eddy currents measured in the receiver reference frame are then computed by forming $M_{eddy\ rec} = M_{fast} - M_{slow}$. (3) The eddy current vector in the transmitter reference frame where it is invariant with respect to receiver attitude is computed using $M_{eddy\ xmtr} = A^t_{slow} * M_{eddy\ rec}$ where $A^t_{slow}$ represents the matrix transpose of the measured slow attitude. (4) Optionally, store $M_{eddy\ xmtr}$ in the computer's memory as a function of the receiver XYZ location so that the correction can be used again if the receiver returns to a position near this location. (5) Still making fast measurements with the system as the receiver's attitude changes, compute a measurement matrix (M) corrected for eddy currents from: $M = M_{fast} - A_{fast} * M_{eddy\ xmtr}$. (6) M can then be used to compute another more accurate $A_{fast}$ and the process defined in (5) and (6) repeated until $A_{fast}$ no longer changes. FIG. 13 illustrates the logical sequence of this second method.

SYSTEM OPERATION WHEN THE EARTH'S MAGNETIC FIELD VECTOR CHANGES WITH RESPECT TO THE RECEIVER

Prior art DC systems such as described in U.S. Pat. Nos. 4,197,855 or 4,303,077, or 4,622,644 could only be operated in environments where the earth's Magnetic field flux did not change with respect to the flux measuring receivers. These devices require an in place calibration to remove the effects of the earth's field on the measured data. If the flux measuring receiver rotated or the earth's field rotated or changed in amplitude the measurements would be in error if the user does not detect this condition and recalibrate the system. Since these systems cannot automatically detect and correct for earth field vector changes with respect to the receiver they cannot be used in moving vehicles and cannot be used in fixed locations where ferrous metal is moving such as the opening of a desk drawer or the movement of a metal chair.

The present invention overcomes this limitation by having a flux transmitter that can be turned on and off and by starting each measurement cycle with the transmitter turned off so that the receiver can measure the earth's magnetic field vector with respect to the receiver and hence correct the data measured when the transmitter is turned on. At the start of the measurement cycle with the transmitter turned off the XYZ components of the earth's field are measured, $E_x\ E_y\ E_z$. When the transmitter is turned on the resultant signal is the sum of the transmitter signal and the earth's field vector. The previously measured $E_x\ E_y\ E_z$ are used to extract the desired transmitted signal from the signal composed of the sum of the transmitted signal plus the earth's field vector. The extraction of the transmitted signal only can be accomplished by several methods. In the disclosed embodiment the earth's field is subtracted by electrically subtracting the signals before amplification is applied. Other methods that could be used when a large amount of signal amplification is not required is just a subtraction in software or the transmitter current levels could be adjusted to provide in addition to the desired signal, a signal that offsets the earth field. Other offsetting methods will be evident to one skilled in the art such as alternating the polarity of the transmitted signal to discriminate against the earth's field. For this case the transmitter never has to be turned off.

Where the earth's field vector is changing very rapidly with respect to the measuring rate of the receiver (for example, when the receiver is located on an aircraft pilot's helmet and the aircraft makes a snap roll at the rate of 180 degrees/sec or the pilot rotates his head from left to right at 180 degrees/sec), all receiver measurements of the transmitted signal do not occur instantaneously after the earth's field is measured, thus the signals measured will contain earth field components that will not be exactly cancelled by a simple subtraction. To provide an exact cancellation one must know the value of the earth field components at the time of each receiver axis measurement as each transmitter axis is turned on.

There are several methods that could be used to obtain the values of the earth field components at the time of measurement of each transmitted signal. Two methods are described, other methods will be evident to those skilled in the art: (1) Since the value of the earth vector is measured at the start of each measurement cycle, one can perform an extrapolation based on the rate of change of the earth vector during previous measurement cycles. Using this extrapolated earth vector one could either (a) in real time as each measurement of the transmitted signal is made, use the extrapolated earth vector to subtract, by previously defined hardware means, the earth field vector from the transmitted signal or (b) subtract the extrapolated earth vector by software means, after the data is collected. The advantage of (a) is that when there is a lot of receiver signal amplification required, it is only the transmitted signal that is being amplified and not a combination of the earth plus transmitted. Since the earth signal is generally large compared to the transmitted signal a lot of amplification cannot be provided even to a portion of the earth signal without exceeding the signal amplitude limits of the measuring circuits. (2) Another method of determining the value of the earth vector at the time of the transmitted signal measurement is by using the earth vector from two consecutive cycles which is equivalent to an earth measurement at the start and end of the measurement cycle then perform an interpolation of the two earth vectors to obtain the earth values at the time of measurement. The measurement values are then corrected in software by subtracting the interpolation earth values. FIG. 14 illustrates this logical sequence of this method. The advantage of method (2) over (1) comes about when the rate of change of the earth's vector is not constant and in such a case an interpolation scheme will always give better results than an extrapolation.

For example, since one computation cycle is composed of roughly four equal measurement time intervals over which the earth's field and the X, Y, Z transmitter antennae are turned on, the receiver data may be rate aided according to the following:

X transmitter data has ¼* (delta earth's field subtracted)

Y transmitter data has ½* (delta earth's field subtracted)

Z transmitter data has ¾* (delta earth's field subtracted) to minimize the effects of dynamics.

I claim:

1. A device for quantitatively measuring the position of receiver antennae relative to transmitter antennae comprising:

transmitter antennae consisting of at least two aparallel antennae to generate at least two DC magnetic vectors;

drive means for sequentially supplying said aparallel antennae with DC pulses to generate said DC magnetic vectors;

receiver antennae consisting of at least two aparallel antennae to detect said DC magnetic vectors;

the number of transmitter antennae times the number of receiver antennae being at least equal to the number of degrees of freedom of the desired quantitative measurement of the position of the receiver antennae relative to the transmitter antennae;

means for compensating for the effects of the earth's magnetic field on the operation of the device; and signal processing means to ascertain the magnitude of the detected DC magnetic vectors and to quantitatively compute said relative position from said received DC magnetic vectors.

2. A device according to claim 1 wherein the number of transmitter antennae times the number of receiver antennae is at least six.

3. A device according to claim 2 wherein there are three transmitter antennae arranged to generate three orthogonal DC magnetic vectors.

4. A device according to claim 2 wherein there are three receiver antennae arranged to detect said generated DC magnetic vectors on three orthogonal axes.

5. A device according to claim 4 wherein there are three transmitter antennae arranged to generate three orthogonal DC magnetic vectors.

6. A device according to claim 5 wherein said transmitter antennae consist of three orthogonal wire windings.

7. A device according to claim 3 wherein said drive means sequentially supplies each transmitter antennae one at a time with a DC pulse.

8. A device according to claim 3 wherein said drive means sequentially supplies transmitter antennae in pairs with a DC pulse.

9. A device according to claim 6 wherein said receiver simultaneously detects three orthogonal components of said DC magnetic vectors.

10. A device according to claim 1 wherein said means for compensating for the earth's magnetic field comprises using said receiver antennae to detect components of the earth's magnetic field while the transmitter antennae are not transmitting, causing said signal processing means to ascertain the magnitude of said components of the detected earth's magnetic field and using the information so ascertained to compensate for the detection of the earth's magnetic field by the receiver antennae when the transmitter antennae are transmitting DC magnetic vectors.

11. A device according to claim 1 wherein said DC pulses are of square waveform.

12. A device for quantitatively measuring the relative location and orientation of receiving antennae with respect to transmitting antennae in the presence of metals utilizing direct current magnetic fields, comprising:
(a) Transmitting means for transmitting direct current magnetic fields sequentially on three orthogonal axes no more than two at a time;
(b) Receiving means for receiving said transmitted direct current magnetic fields;
(c) Means for supplying direct current electrical signal pulses to said transmitting means for creating said transmitted direct current magnetic fields;
(d) Means for controlling circuit elements of said transmitting and receiving means, measuring received signals, and converting output signals from said receiving means into location in three coordinate directions and orientation about three coordinate axes measurements.

13. A device according to claim 12 comprising said transmitting means consists of a core and three orthogonal antenna axis wire windings.

14. A device according to claim 12 wherein said means for controlling, measures the earth's magnetic field while the said transmitting means is shut off, and produces a signal representing the earth's magnetic field and subtracts said earth's field signal from said received signal to cancel the effect of the earth's magnetic field when the transmitting means is transmitting.

15. A device according to claim 1, wherein said receiving means for receiving said transmitted direct current magnetic fields consists of three orthogonal antennae axes that are sensitive to transmitted direct current magnetic fields to earth's magnetic fields.

16. A device according to claim 1 wherein low frequency AC noise interference superimposed on the detected DC magnetic vectors is cancelled by said signal processing means by first measuring the desired signal (S) with the interference (N) to provide a first measurement M(t) which is S+N, then measuring the desired signal with the interference (N) an odd number of half periods of the low frequency noise interference after the first measurement to provide a second measurement M(t+n/f) which is S−N when n is the odd number and f is the frequency of the noise, and adding the first and second measurements together to obtain the desired signals free from the interference N.

17. A device according to claim 10 wherein AC noise interference superimposed on the detected DC magnetic vectors is cancelled by using said receiver antennae to sequentially measure each transmitter vector and the earth's magnetic field while the transmitter antennae are not transmitting, at a rate equal to the frequency of the noise, whereby the noise is treated as if it were a part of the earth's magnetic field, said signal processing means being caused to ascertain the magnitude of components of the detected earth's magnetic field and noise and to use the information so ascertained to compensate for the detection of the earth's magnetic field and the noise by the receiver antennae when the transmitter antennae are transmitting DC magnetic vectors.

18. A device according to claim 1 wherein low frequency AC noise interference superimposed on the detected DC magnetic vectors is minimized by the signal processing means by ascertaining the zero crossing points of the AC noise and ascertaining the magnitude of the detected magnetic vectors at said zero crossing points.

19. A device according to claim 18 wherein successive measurements of said magnitude are made at zero crossing points an odd number of half periods, of the low frequency AC noise interference, apart, these measurements are added together to cancel remaining interference from the desired signals.

20. A device according to claim 10 wherein said signal processing means computes the components of the earth's magnetic field between successive detections thereof while the transmitter antennae are not transmitting and uses these computed components to compensate for the earth's magnetic field detected by the receiver antennae while the transmitter antennae were transmitting between said successive detections.

21. A device according to claim 10 wherein said signal processing means projects the components of the earth's magnetic field between successive detections thereof while the transmitter antennae are not transmitting and uses these projected components to compensate for the detection of the earth's magnetic field by the receiver antennae while the transmitter antennae are transmitting between following successive said detections.

22. A device according to claim 1 wherein, in order to increase usable rate of supply of said DC pulses in the presence of metals, said signal processing means makes multiple measurements of the detected DC magnetic vectors during the decay of interfering eddy currents induced by the wavefront of each DC pulse, fits these measurements to an appropriate exponential function, projects the steady state measurement of the detected DC magnetic vectors after said decay is complete and uses these projected steady state measurements to compute said position.

23. A device according to claim 1 wherein, in order to increase the usable rate of supply of said DC pulses in the presence of metals stationary relative to the transmitting antennae, the signal processing means measures the detected DC magnetic vectors during a DC pulse after decay of eddy currents induced by the wavefront of that DC pulse for a known location of the receiver antennae relative to the transmitter antennae, measures the detected DC magnetic vectors at a desired rate of supply of said, DC pulses in the same said known location, computes the eddy current induced distortion in the measurement made at the desired rate, stores the computed distortion information and uses this stored information to correct subsequent measurements of detected DC magnetic vectors at said desired rate at said known location to compute attitude data free from eddy current induced distortion.

24. A system for quantitatively measuring the position of magnetic field sensor means with respect to magnetic field transmitter means, comprising:

transmitter means consisting of at least two magnetic field transmitter elements to generate a corresponding number of aparallel DC magnetic field vectors;

drive means for sequentially supplying said transmitter elements with DC pulses to generate said aparallel DC magnetic field vectors;

magnetic field sensor means consisting of at least two magnetic field sensor elements differentially responsive to said magnetic field vectors generated by the said transmitter elements;

the arithmetic product of the number of transmitter elements and the number of sensor elements being not less than the number of degrees of freedom to be measured;

means for compensating for the effects of the earth's magnetic field;

means operable to effect executive control of the said drive means and of the said compensating means and to compute from signals derived as a result of such executive control the relative position of the magnetic field sensor means with respect to the said magnetic field transmitter means.

25. A device according to claim 1 wherein said means for compensating for the effects of the earth's magnetic field comprises alternating the polarity of transmitted DC magnetic vectors to discriminate against the earth's magnetic field.

* * * * *